US008792090B2

(12) United States Patent
Woodford

(10) Patent No.: US 8,792,090 B2
(45) Date of Patent: Jul. 29, 2014

(54) DOCUMENT OF VALUE, METHOD OF MANUFACTURE AND METHOD OF DETECTING SOIL OR WEAR

(75) Inventor: Malcolm Woodford, Portsmouth (GB)

(73) Assignee: De la Rue International Limited, Hampshire (GB)

( * ) Notice: Subject to any disclaimer, the term of this patent is extended or adjusted under 35 U.S.C. 154(b) by 240 days.

(21) Appl. No.: 13/128,144

(22) PCT Filed: Oct. 30, 2009

(86) PCT No.: PCT/GB2009/002581
§ 371 (c)(1), (2), (4) Date: Jul. 19, 2011

(87) PCT Pub. No.: WO2010/055279
PCT Pub. Date: May 20, 2010

(65) Prior Publication Data

US 2011/0267601 A1 Nov. 3, 2011

(30) Foreign Application Priority Data

Nov. 14, 2008 (GB) .................................. 0820882.9

(51) Int. Cl.
*G06K 9/74* (2006.01)
*G07D 7/18* (2006.01)

(52) U.S. Cl.
CPC ........................................ *G07D 7/18* (2013.01)
USPC ............................................................ 356/71

(58) Field of Classification Search
USPC ...................................... 356/71, 392; 702/40
See application file for complete search history.

(56) References Cited

U.S. PATENT DOCUMENTS 4,650,319 A * 3/1987 Stenzel et al. .................. 356/51
4,710,963 A * 12/1987 Chapman et al. ............. 382/112

(Continued)

FOREIGN PATENT DOCUMENTS

EP 1 139 302 A1 10/2001
EP 1 501 054 A2 1/2005

(Continued)

OTHER PUBLICATIONS

Written Opinion of the International Searching Authority issued in Application No. PCT/GB2009/002581; Dated Feb. 8, 2010.

(Continued)

*Primary Examiner* — Tarifur Chowdhury
*Assistant Examiner* — Hina F Ayub
(74) *Attorney, Agent, or Firm* — Oliff PLC

(57) ABSTRACT

A method of manufacturing a soil or wear test feature on a document of value is provided. The method comprises designating an area of the document of value for soil or wear testing and measuring an optical characteristic which is affected by the presence of soil or wear of the designated area on the document of value, or of the same area on an identical document of value. The measured optical characteristic is encoded to generate corresponding optical characteristic data and the encoded optical characteristic data is associated with the document of value by means of a machine readable element provided on the document of value. Also provided is a method of detecting soiling or wear of a document of value, comprising measuring an optical characteristic which is affected by the presence of soil or wear of a designated area on the document of value; reading data from a machine readable element provided on the document of value to retrieve encoded optical characteristic data generated from previous measurement of the optical characteristic of the designated area, or of the same area on an identical document of value; and comparing the measured optical characteristic with the encoded optical characteristic to identify any difference therebetween, a difference being indicative of soiling or wear of the document of value.

22 Claims, 9 Drawing Sheets

(56) References Cited

U.S. PATENT DOCUMENTS

| | | | | |
|---|---|---|---|---|
| 4,837,840 | A | 6/1989 | Goldman | |
| 6,918,535 | B1 | 7/2005 | Brosow | |
| 8,107,712 | B2 * | 1/2012 | Holl | 382/135 |
| 8,588,477 | B2 * | 11/2013 | Holl et al. | 382/112 |
| 2006/0140468 | A1 | 6/2006 | Holl | |
| 2009/0201504 | A1 * | 8/2009 | Ho et al. | 356/399 |
| 2011/0168776 | A1 * | 7/2011 | Jalali et al. | 235/385 |

FOREIGN PATENT DOCUMENTS

| | | | |
|---|---|---|---|
| EP | 1785 951 | A | 5/2007 |
| WO | WO 03/021520 | A1 | 3/2003 |
| WO | WO 2006/053685 | A2 | 5/2006 |
| WO | WO 2006/092626 | A1 | 9/2006 |
| WO | WO 2008/007064 | A1 | 1/2008 |
| WO | WO 2008/058742 | A1 | 5/2008 |
| WO | WO 2008058742 | A1 * | 5/2008 |
| WO | WO 2009/071673 | A1 | 6/2009 |
| WO | WO 2010/023428 | A1 | 3/2010 |

OTHER PUBLICATIONS

International Preliminary Report on Patentability issued in Application No. PCT/GB2009/002581; Dated Feb. 8, 2010.

International Search Report issued in Application No. PCT/GB2009/002581; Dated Feb. 8, 2010.

* cited by examiner a) b) c) d) e) f)

a)

b)

DOCUMENT OF VALUE, METHOD OF MANUFACTURE AND METHOD OF DETECTING SOIL OR WEAR

This invention relates to documents of value such as currency, banknotes, identification documents, passports and certificates, and in particular is concerned with detecting the soiling or wear of such documents to determine whether the document remains fit for use. The description below will focus on the application of the invention to banknotes, but it will be appreciated that the same concept can be extended to any document of value. In particular, the invention provides methods of manufacturing a soil or wear test feature on a document of value, and methods of detecting soil or wear of a document of value.

The banknote cycle comprises the following elements:

a) new notes are issued into circulation via the banking system;

b) consumers use the banknotes for transactions and eventually they are returned to the banking system;

c) central banks and/or commercial banks sort the returned notes into fitness categories: those fit for re-issuing, and those that have become worn or soiled to the point where they are no longer fit for circulation.

This last stage is critical for the central banks for several reasons. Firstly, a circulation containing excessively soiled notes is more susceptible to attack by counterfeiters, since banks and other users become used to handling notes of varying quality and are less likely to identify forgeries. Soiled currency is also bad for a country's image and reputation.

However, it is also essential that the sorting stage (c) is highly accurate, since fit notes that are incorrectly categorised as unfit for re-issue must be replaced and so represent a loss to the central bank.

One of the key fitness criteria is how soiled (dirty) a banknote is. The term "soil" covers any substance which may be deposited onto a banknote and affect the appearance thereof. Thus a soiled banknote generally exhibits a change in colour (relative to the original unsoiled document) due to the addition of a stray substance such as skin oils or dirt. However soiling could also be due to the addition of individual marks such as graffiti (i.e. pen/pencil) or stains, which may be deliberate or not. The spectral response of soil on banknotes from different parts of the world and from one note to another is remarkably consistent, having a yellow hue as shown in FIG. 1. It has also been found that, except in the case of one-off stains such ink marks and drink spillages, soil is remarkably uniformly distributed across the surface of banknotes.

Conventionally, soil level is estimated by measuring the reflectivity of a banknote in an area containing little or no print. A typical process involves:

a) illuminate the note with a monochromatic light;

b) identify the most reflective areas of the note (usually a defined percentage of the note area);

c) calculate the average reflectance in these areas;

d) compare the result with accept/reject criteria (such as a predetermined reflectance threshold); and e) sort the note to the appropriate pocket or shredder depending on the result of the comparison.

Variations of this known technique include illumination by white light and the use of a colour filter in front of the light detector, illuminating in other parts of the non-visible spectrum such as infrared, and using more than one wavelength to make the accept/reject decision.

Examples of such conventional processes are given in WO-A-2008/058742, US-A-2006/0140468 and EP-A-1785951, amongst others. Our International patent application no. PCT/GB2009/01978, not published at the date of filing the present application, discloses an alternative technique.

The conventional techniques depend on the fundamental assumption that, in their unsoiled state, all notes of any one sort should have a consistent measurable reflectance whatever wavelength is selected. However, in practice, it has been found that the reflectance of unsoiled notes varies due to a number of factors.

Banknotes from any one currency can be supplied by a number of different manufacturers and produced in separate batches. This leads to:

a) variation in specular reflectance from one batch to the next and even between notes in one batch, due to differences in paper smoothness;

b) variation in reflectance due to discrepancies in paper colour and opacity;

c) variation in reflectance due to discrepancies in print density over the regions of the banknote used for determining the degree of soiling; and d) variation in fibre furnish due to degree of refining, type of fibre (such as abaca, linter and woodpulp) used and proportion of different fibre types used.

It should be noted that control of the paper colour is particularly difficult to manage due to the nature of the paper manufacturing process. Paper colour can vary due to wet-end chemistry, the retention of pigment, the addition of opacifiers and the separate addition of pigments.

It is relatively straightforward to control the colour of print by specifying the ink to be used (e.g. in terms of its Pantone® number), but variations in print density (and so the print's reflectance) are likely to occur unless the printing process is very tightly controlled. In general, variations in print occur due to the colour and opacity of the ink and the film thickness of ink applied.

Together, variations in paper and print lead to a significant difficulty in controlling the reflectance of the document.

This variability can lead to significant inaccuracies in the fitness sorting process. Banknotes that are fit for circulation can be incorrectly designated as unfit (for example, if the print and/or paper is dark, leading to a decrease in its intrinsic reflectivity) and are destroyed. This increases the cost of maintaining banknotes in circulation: typically between 10% and 40% of rejected banknotes are in fact fit for circulation so the losses are substantial.

Conversely, banknotes that should be removed from circulation because they are excessively soiled may remain in circulation (for example, if the original ink was lightly printed such that even with high soiling, the reflectance remains sufficiently high to pass the fitness test). This reduces the security of the banknotes and has a negative impact on the public perception of the issuing bank.

The paper and print variation issues which lead to these problems are most prevalent in a currency operating a "clean note" policy (i.e. applying a relatively low soiling threshold at which notes will be destroyed), and when there are notes of a given denomination in circulation from a variety of production batches and/or multiple suppliers.

Another key fitness criteria, closely related to the soil level, is the level of wear which has been suffered by a document. 'Wear' is the loss of print from a document due to ink abrasion caused by repeated handling of the document. Overly worn documents also need to be accurately identified and removed from circulation. Polymer-based banknotes are particularly susceptible to wear.

What is needed is a technique for identifying soiled or worn secure documents, particularly banknotes, which does not suffer from the aforementioned problems.

In accordance with the present invention, a method of manufacturing a soil or wear test feature on a document of value, comprises:

designating an area of the document of value for soil or wear testing;

measuring a property of the document which is affected by the presence of soil or wear from the designated area on the document of value, or from the same area on an identical document of value;

encoding the measured property to generate corresponding property data; and associating the encoded property data with the document of value by means of a machine readable element provided on the document of value.

The present invention also provides a document of value comprising a soil or wear test feature, the soil or wear test feature comprising:

a designated area of the document of value for soil or wear testing; and a machine readable element in which data is stored, which associates the document of value with encoded property data generated from the measurement of a property of the document which is affected by the presence of soil or wear of the designated area on the document of value, or of the same area on an identical document of value;

whereby a comparison of the encoded property data with the property of the designated area provides an indicator of the degree of soiling or wear of the document of value.

By measuring a property such as colour of a designated area of a document (or of an identical document) and linking the outcome of the measurement to the document in this way, the soil or wear detection process is made independent of variations in the paper hue, print density or print colour. This is because the measurement taken from the document is itself inherently dependent on the colour (or other selected property) of the paper and/or ink and so these factors are included in the encoded data. Hence, later measurements for soil or wear detection (which will also be inherently dependent on the original paper/ink colour to exactly the same extent) can be compared directly with the recorded data, any variations in the paper/ink colour (or other property) being cancelled out in the comparison process.

In the presently disclosed method, it will be noted that the particular document of value from which the property of the designated area is measured need not be the same particular document of value as that with which the encoded colour data is then associated. For example, the colour of the designated area may be measured only on the first document of a batch of such documents which are being printed in a run (and hence should all be identical). The encoded data corresponding to the measured colour can then be written on all subsequent documents of the same batch without having to re-measure the colour of the designated area for each document. Of course, in this case, the designated area should be in the same position on each document.

The property data can be encoded in any suitable machine-readable form, e.g. 8 bit RGB encoded. Another way of encoding the data is to use a 1-dimensional or 2-dimensional barcode. In the case of 8 bit RGB encoded data, a 6 digit Hex code can be used.

The encoded data recording the measured property can be associated with the document of value in a number of ways. In a preferred embodiment, the encoded property data is associated with the document of value by storing the encoded optical characteristic data in the machine readable element. That is, the colour value itself (or other property measurement) is recorded in the machine readable element in such a way that the recorded value can be retrieved directly from the machine readable element (given apparatus for reading the element). This has the advantage that the soil or wear test feature is entirely self-contained: no additional equipment need be provided in order to use the feature to measure soiling (or wear).

However, in other preferred implementations, the encoded property data is associated with the document of value by storing the encoded property data in a database and storing a unique identifier in the machine readable element on the document of value, the unique identifier being linked to the encoded property data in the database. That is, rather than record the property data on the document itself, the machine readable element need only carry an identification code which is capable of uniquely identifying the document relative to many others of the same type. The measured property data can then be stored remotely, in a database, and the unique identifier used to look up the relevant data when the soil or wear level of the document is to be checked. This reduces the data storage capacity required of the machine readable element and enables it to be combined, if desired, into a feature already provided on the document of value, such as the unique serial number typically found on a banknote.

Any data storage element capable of being read by machine could be provided on the document to link the document with the encoded data. In preferred examples, the machine readable element comprises: a machine-readable alphanumeric code; a one-dimensional or two-dimensional barcode; a graphic design code, a magnetic ink character recognition code, or a RFID chip. Depending on the type of element selected, the element may be provided on or incorporated within the document. In particular examples, the machine readable element is provided on the document of value by printing, laser marking or perforation.

Machine readable elements such as these are known in the art from WO-A-2006/053685, WO-A-2006/092626, EP-A-1139302 and U.S. Pat. No. 6,918,535, amongst others. However, in all of these cases the data stored in the machine readable element is used for authentication of the document and hence must relate to a characteristic of the document which is invariable over the lifetime of the document (i.e. unaffected by soil and/or wear) in order for authentication to be performed successfully.

In general, it is preferred that the present machine readable element be unobtrusive so as to avoid detracting from the appearance of the document. Preferably, therefore, the machine readable element is not visible to the human eye. However, this can also be achieved by camouflaging the machine readable element, for instance by providing the element in the form of a graphic design code, which an observer will view as part of the document design.

The machine readable feature could be provided anywhere on the document, but it is advantageous to locate the machine readable element adjacent a visible security feature provided on the document of value, preferably a serial number, graphic, watermark or optically variable element. This is convenient since the data can be captured at the same time as reading the serial number, and the data is easy to locate on the document. For example, the code may follow or precede the serial number. In an alternative embodiment the encoded colour data could be integrated into the serial number, for example arranging the serial number to include one or more digits/letters which carry the encoded data.

The measurement of the colour or other property can take place anytime in the production process of the value document. It could take place during or immediately after manufacture of the base substrate—for example, the paper colour could be measured immediately after the papermaking process. Polymeric substrates for value documents are also well known in the art and typically the base substrate is produced by overprinting a transparent polymeric substrate with one or more opacifying layers. Conventional security printing is then provided on top of the opacifying layers. In one application of the current invention the colour of the opacifying layer can be measured prior to the further printing processes and encoded onto the document.

The designated area for soil or wear detection may consist of any portion of the document up to and including the entire surface area of the document. Preferably, the designated area for soil or wear testing comprises: a region of the document of value having a substantially uniform appearance, preferably a substantially unprinted region of the document; a region of security print; or a region of an applied security element at least partly exposed at the surface of the document.

Typically, the designated area will be at the same location on each document, or at least each document of any one type. The location could be predetermined and stored in memory, e.g. in a template provided for each document type. However, the designated area could be at different locations on each document. In certain embodiments, therefore, the method preferably further comprises associating the document of value with location data identifying the location of the designated area for soil or wear testing on the document of value by means of the or a second machine readable element. In one embodiment, this could comprise providing a machine readable boundary around the designated area on the document, e.g. a printed magnetic outline surrounding the measured area. However, preferably this comprises encoding the location of the designated area to generate encoded location data, and associating the encoded location data with the document of value. For example, further encoded data may be written onto the document providing information as to where the designated area is located. Alternatively, the encoded location data could be stored in a database and a unique identifier on the document used to retrieve it. In one example, the location data could comprise the co-ordinates and/or dimensions of the designated area, relative to a corner or other point of the document. This encoded data is preferably provided in the same machine readable format as the encoded property data. Advantageously, this data would be provided alongside the encoded property data.

In addition to encoding the measured property of the designated area onto the document, the machine readable element could also provide additional information such as information about security elements on the document or information about the production processes the value document has been through. Such information could include design information, a summary of applied security features, a summary of printed or substrate based security features, denomination indicator, serial number, sheet number, batch number, name of printer, name of papermaker, production date and quality data. Such information can be used to "track" the document and assist in authentication, as described in WO-A-2006/053685.

As already indicated, it is preferably the colour of the designated area that is measured, encoded and stored, since this has been found to vary with soiling (or wear) in a predictable and noticeable manner. In particularly preferred embodiments the colour is a measure of the document's reflectance at one or more predetermined wavelengths. However, any measurable property that is affected by soiling and/or wear could be used, and hence preferably the measured property is any of: reflected or transmitted colour, reflectance, light scatter, gloss, roughness, luminescence, fluorescence, X-ray transmission, magnetism, or thermal emissivity. It should be noted that the "colour" measured may be inside or outside the visible spectrum, or a combination of both. In general it is preferred that the measured property is an optical characteristic of the document.

Depending on the particular property measured, i.e. whether it is affected by soil and/or wear, the test feature will provide for direct measurement of either soil level or wear level or a combination of the two. However, it has been found that the degree of soiling exhibited by a document typically increases in step with the degree of wear and, as such, both an indication of soil level and of wear level can, if desired, be deduced from measuring and recording a single property of the designated area.

Thus, the method of the present invention can be also used to monitor wear, the level of which will also determine whether a note should remain in circulation. In this example a designated area of the value document is selected which will exhibit wear and a characteristic property is selected which will indicate any change in wear. In a particularly preferred embodiment, the method further comprises providing the designated area with an element of increased susceptibility to soiling and/or wear, preferably a frangible structure. Suitable frangible structures for this purpose are disclosed in our International patent application No. PCT/GB2009/001978.

The measurement of the colour or other property of the designated area can also take place during or after any of the process steps used to create the document of value. Typical print processes employed in the production of value documents are lithographic printing, screen printing, rotogravure printing, intaglio printing, flexographic printing and letterpress. In one preferred example, the property is measured prior to any printing of the document of value, in which case the measurement relates to the property of the base substrate and hence the designated area should preferably remain substantially unprinted when the document is complete.

In other examples, the property is measured after at least some, preferably all, printing of the document of value has taken place. In general it is preferred that the measurement is taken as close to the end of the production process as possible. Hence, the measurement process may take place at the end of the security printing processes—for example during a final inspection process. At this stage the value document may still be part of a web or sheet or may have already been converted to a single document. In the latter case a single note inspection unit could be used for the measurement process. The measurement process may also take place immediately before the value document is placed into circulation. For example, prior to issuing a banknote the central bank may measure the designated area of the banknote using a single note inspection machine and then apply the necessary machine readable data—the generation and application of the soil/wear test feature can take place entirely independently of the other manufacturing steps involved in production of the document.

In order to verify the measurement of the colour or other property it is preferable that the measurement is carried out at least two points in the production process. Hence, preferably, the method further comprises repeating measurement of the property of the designated area in order to verify the property prior to generating the encoded optical characteristic data. For example, for a value document on a paper substrate, the paper colour of the designated area could be measured after the paper production process (before printing) and again (after printing) prior to dispatch to the central issuing bank. Alternatively, after the encoded data has been recorded and associated with the document, the selected property of the designated area may be re-measured and compared with the encoded data as a quality check. This may be performed for every document, a batch of documents or a representative sample. The quality check may, for example, be carried out by the central issuing bank prior to issue.

However, in all cases it is preferable that the steps of measuring the property and associating it with the document are prior to issue of the document of value. This ensures that the recorded data corresponds to the document in a clean, unworn state.

Preferably, the document of value is a banknote, cheque, certificate, passport or other security document.

The present invention also provides a method of detecting soiling or wear of a document of value, comprising:

measuring a property of the document which is affected by the presence of soil or wear from a designated area on the document of value;

reading data from a machine readable element provided on the document of value to retrieve encoded property data generated from previous measurement of the property of the designated area, or of the same area on an identical document of value;

comparing the measured property with the encoded property to identify any difference therebetween, a difference being indicative of soiling or wear of the document of value.

In some circumstances, all that may be required of the technique is to classify the notes with an indication of soiling in terms of the whether there is a difference between the measured property and that corresponding to the encoded data, or not. However, a more detailed approach can be taken by determining the magnitude of any difference between the measured and stored values and using this to determine whether a document is fit for re-issue or not. As such, it is preferable that the step of comparing comprises calculating the difference between the measured property and the encoded property, the calculated difference providing an indicator of the degree of soiling or wear of the document of value. The calculated difference can be used to assign a soiling or wear level to the document.

Preferably, the method further comprises comparing the calculated difference with a predetermined fitness criterion representative of documents fit for reissue, and sorting the document of value based on the outcome of the comparison. The fitness criterion may relate to soil level, wear level or a combination of the two. Conversely the calculated difference could be compared with a criterion representative of unfit documents. The criteria may, for example, constitute predetermined threshold difference values. The documents may then be sorted according to whether or not the difference value measured meets the predetermined criteria.

Advantageously, the method further comprises diverting the document of value to a reject receptacle if the predetermined fitness criterion is not met, and diverting the document of value to a storage receptacle for reissue if the predetermined fitness criterion is met.

Examples of documents and methods in accordance with the invention will now be described with reference to the accompanying drawings, in which:—

Figure 8:
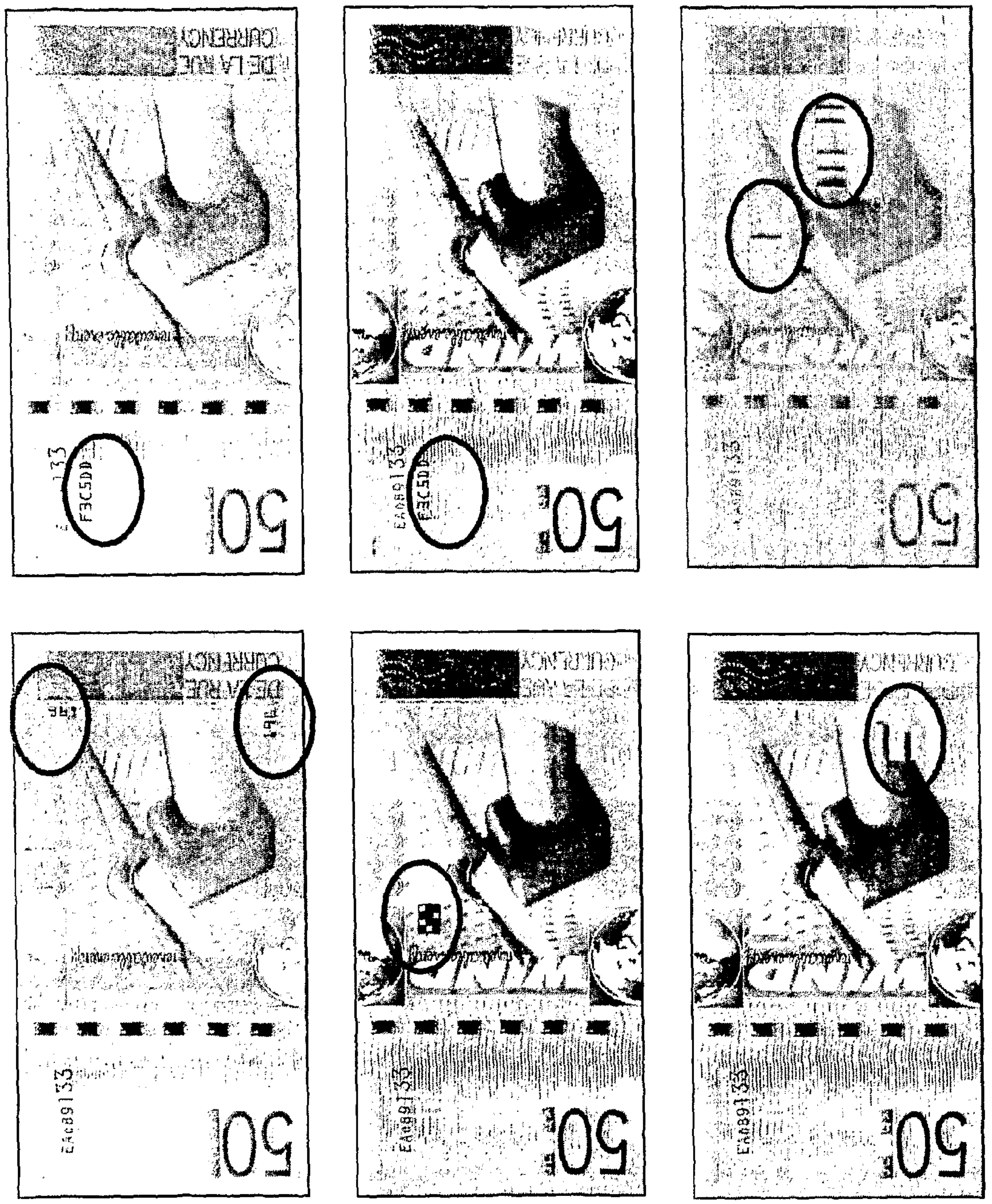
Figure 9:
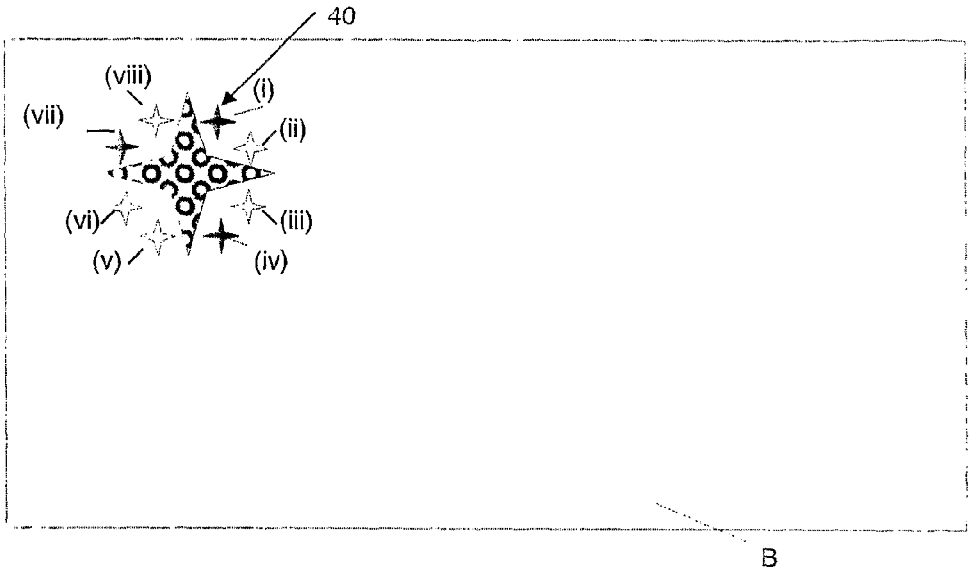
Figure 9:
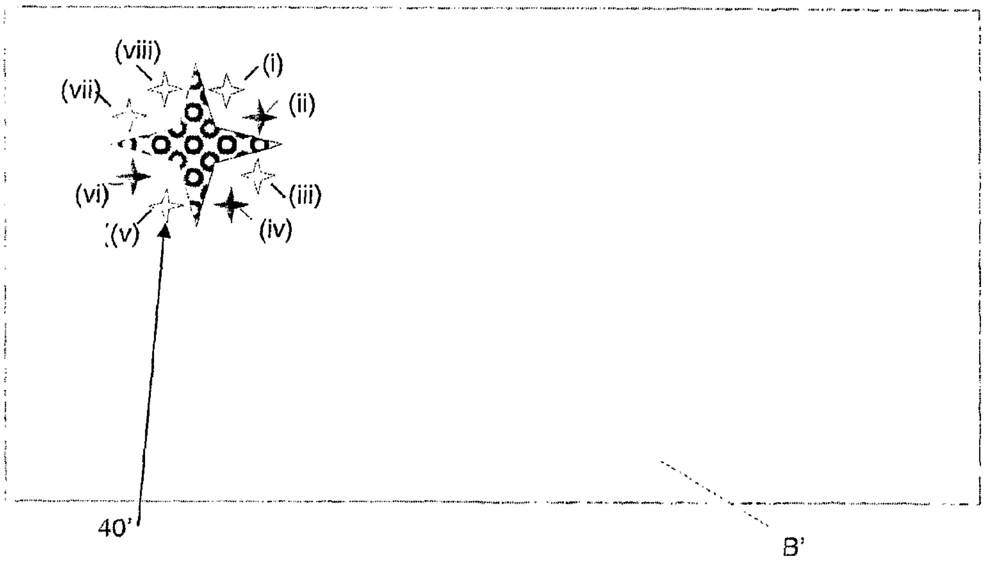

FIGS. 8 *a*) to *c*) illustrate six further embodiments of documents of value; and FIGS. 9 *a*) and *b*) depict exemplary machine readable elements which may be used in any of the above embodiments.

Various examples of documents and methods according to the invention will now be described. As indicated above, the invention finds particular application in currency, in particular on banknotes, but could be used analogously on any other type of document of value, including cheques, certificates and identification documents such as passports.

Since the soil level of a banknote and its wear level generally increase in step with one another, the two are intrinsically linked. As such, a measure of a document's soiling level will also provide an indication of its wear level, and vice versa.

Figure 1:
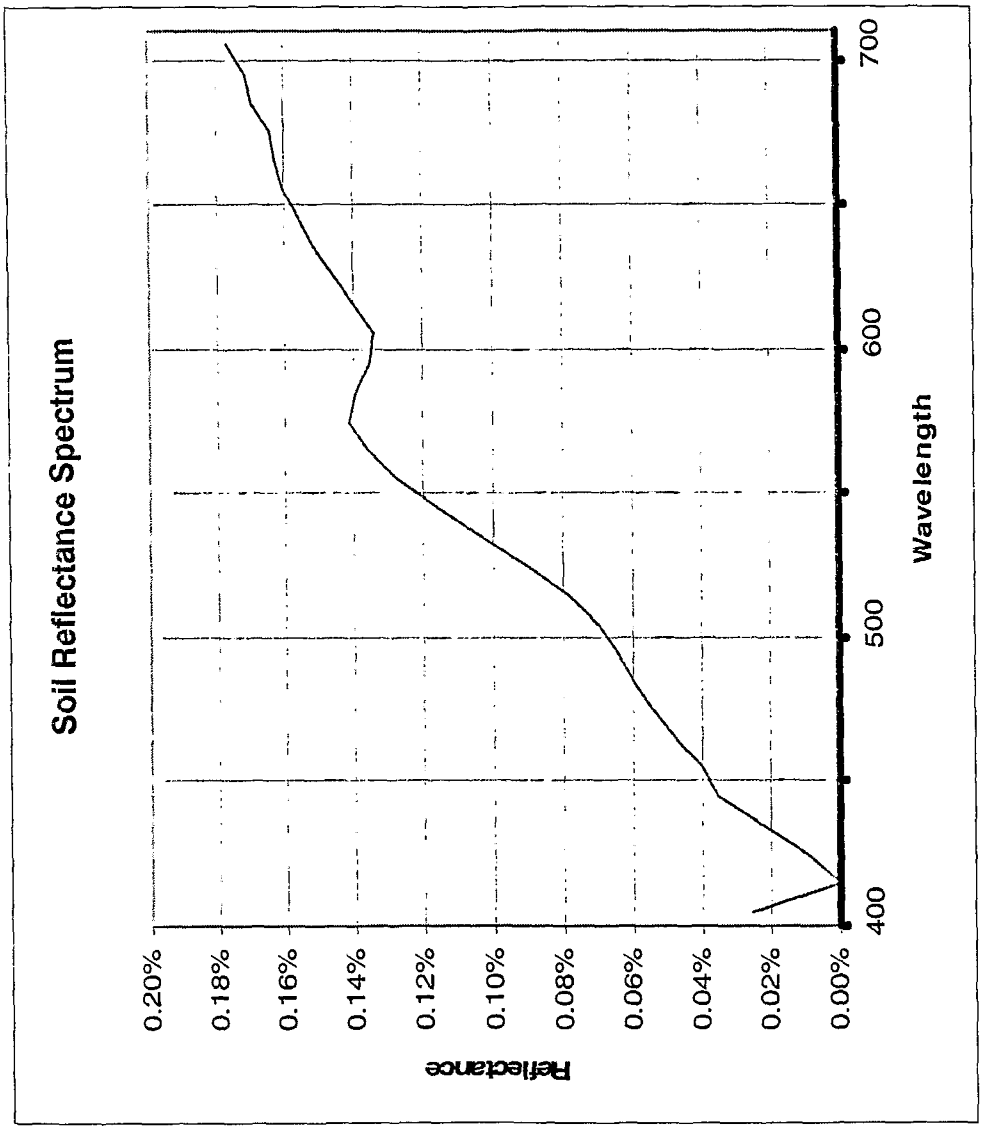
FIG. 1 shows a typical reflectance spectrum obtained from soil commonly found on banknotes.

As shown in FIG. 1, typical soil found on banknotes is predominantly reflective at wavelengths over 550 nm, i.e. having a yellow hue. Build up of soil on banknote therefore changes the colour which will be detected from the banknote surface. However, soil and/or wear will also affect certain other properties of the document and hence any property of the document which will change due to soil build up and/or wear could be measured instead of colour. For example, the measured property could be the reflectance, transmittance, light scatter, gloss, roughness, luminescence, fluorescence, X-ray transmission, magnetism, thermal emissivity or any other suitable property which can be measured. The property may be affected by soiling (e.g. colour, reflectance), by wear (e.g. roughness, magnetism) or both (e.g. luminescence, fluorescence).

In the following examples, the reflectance of the document is used as the selected property and this can be detected using a conventional detector arrangement, illuminating the designated area with light and using a photodetector, camera, contact image sensor or other optical detection device to receive reflected light. The incident light may be monochromatic or broadband (e.g. white light), but in the latter case it is preferred to provide a spectral filter between the light source and the detector to specify the wavelength (or waveband) of interest. Measuring the reflectance at a specific range of wavelengths is in effect a measure of the document's colour. Preferably, the reflectance is measured in the blue region of the spectrum since, as demonstrated by FIG. 1, this will be the region most significantly affected by the build up of soil (which tends to absorb such wavelengths).

Measurement of other properties can be carried out using standard equipment for the property in question, such as magnetic heads, thermal imaging equipments or an X-ray scanner.

Figure 2:
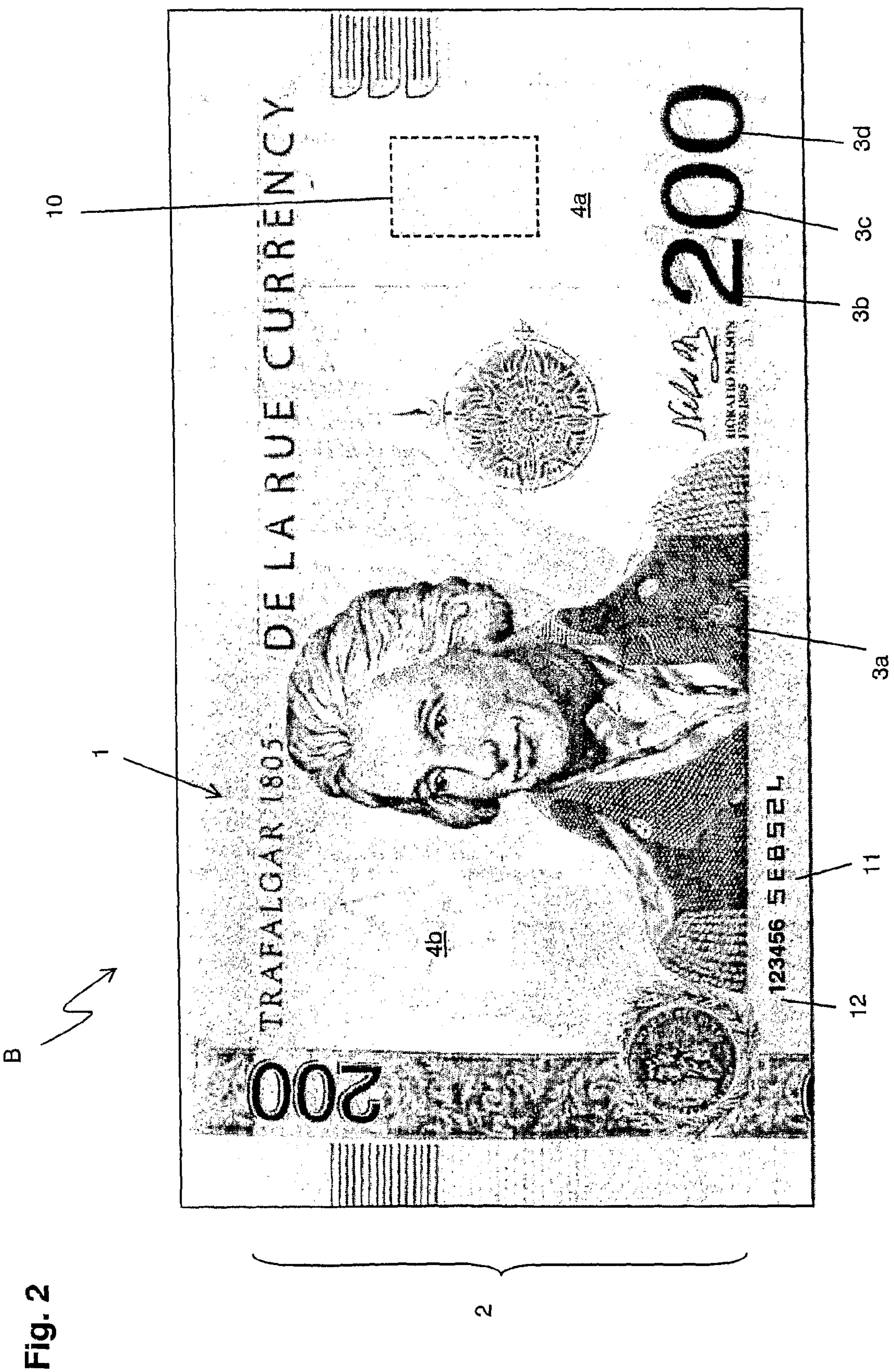
FIG. 2 shows a first embodiment of a document of value.

A first embodiment of a document of value is shown in FIG. 2 which depicts a banknote B having an area 10 which is designated for soil detection. The banknote B comprises a substrate 1, typically made of paper or polymer, on which is printed a graphics layer 2. The graphics layer 2 typically includes recognisable indicia such as pictorial design 3*a* (in this case a portrait) and letters or numbers 3*b*, 3*c* and 3*d*, here designating the numeral "200". The indicia are typically surrounded by background prints such as 4*a* and 4*b* which are of relatively uniform appearance compared with the indicia. The graphics layer may also include one or more regions which are not printed (i.e. gaps in the graphics layer).

Commonly, the graphics layer incorporates security features such as fine line prints and guilloches, and parts of the graphics layer may be printed using techniques such an intaglio which increase the difficulty of counterfeiting the banknote. Other security features such as security threads (magnetic or otherwise), holograms, optically variable inks, watermarks and embossings may be incorporated in or applied to the banknote as desired.

The designated area 10 on the value document can be located in a region of the unprinted base substrate, a region of security print or a region of an applied security feature, which is at least partly exposed on the surface of the document, such as a thread, stripe or patch. The designated area 10 is preferably chosen to lie in a region of the banknote having a reasonably uniform appearance, such as a portion of the background 4*a* or 4*b* or an unprinted region of the banknote. In the present example, the area 10 is situated in a lightly printed background region 4*a*, which is of substantially uniform appearance. The designated area 10 may consist of any portion of the note up to and including the entire surface area of the note. If the colour of the note does vary within the area 10, an average colour measurement may be used.

In this example, after the graphics layer 2 has been printed, the colour of the designated area 10 is measured. In other examples, the colour could be measured prior to printing. The colour can be measured using any appropriate technique, and any appropriate colour space, such as CIE 1976 (L*, a*, b*) colour space (CIELAB) or RGB colour space.

The measured colour is then encoded, for example 8 bit RGB encoded, and written onto the document B in the form of a machine-readable code 11. In the example given, the code represents the measured colour using six digit hexadecimal coding. Another way of encoding the data is to use a 1-dimensional or 2-dimensional barcode. The code 11 may be printed onto the document B in a further printing step, or could be applied using another technique, such as mechanical or laser perforating or laser marking. The data could be printed using inks which show one or more of the following properties: fluorescent, phosphorescent, infrared absorbing, thermochromic, photochromic, magnetic, electrochromic, conductive and piezochromic.

In other examples, the encoded data could be incorporated into the document using graphical means, of which an example is described below, or via a Magnetic Ink Character Recognition code. Magnetic Ink Character Recognition, or MICR, is a character recognition technology which allows computers to read information (such as account numbers) from printed documents. MICR characters are printed in special typefaces with a magnetic ink or toner, usually containing iron oxide. As a machine decodes the MICR text, it first magnetizes the characters in the plane of the paper. Then the characters are then passed over a MICR read head and as each character passes over the head it produces a unique waveform that can be easily identified by the system.

Printing techniques suitable for printing the code include any technique capable of variable data printing and include digital printing techniques such as inkjet printing, laser printing, thermal transfer printing and thermal transfer dye sublimation printing. Alternatively the letterpress printing technique which is currently used for printing serial numbers on banknote could be used. In modern letterpress printing presses the number boxes which generate the serial numbers can be changed in real-time and linked to an inspection system. Such an inspection system is the NotaSave colour-inspection system for security printing presses available from KBA Giori. In this manner the encoded data could be easily incorporated into the serial number or positioned adjacent to the serial number as shown in FIG. 2. This is advantageous since the code 11 can be readily located and can be read simultaneously with the serial number 12.

In still further examples, the encoded data could be recorded on the banknote B by means of a RFID chip or other contactlessly readable data store.

Figure 3:
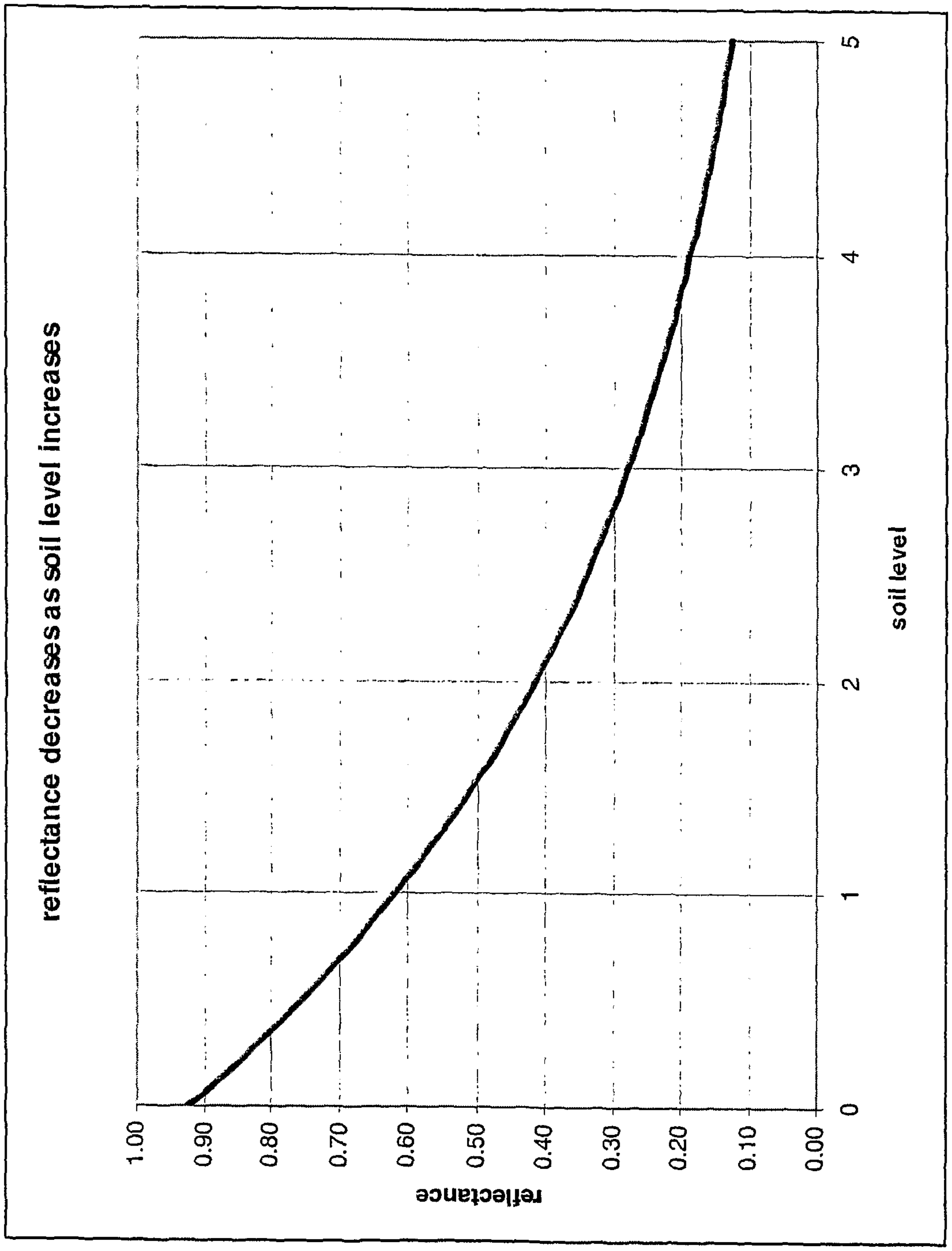
FIG. 3 shows the variation in reflectance with increasing soil level for an exemplary document of value.

To detect the level of soiling of the banknote B (which test would generally be performed after the banknote has been in circulation for some time), the colour of the designated area 10 is measured and the code 11 is read. The level of soiling is determined by comparing the measured colour of area 10 with the colour recorded in code 11. As shown in FIG. 3, a build up of soil on the note B causes the reflectance of the note, at any one wavelength, to decrease. Since soil absorbs more readily at some wavelengths than others (see FIG. 1), this leads to a change in colour. Hence, if a note is soiled, the colour measured from area 10 will be found to no longer match the colour corresponding to recorded data 11.

Depending on the level of soiling that is deemed permissible, the results of the comparison can be used in a number of ways. In one embodiment, if the colour measured from area 10 is found to differ from the recorded colour (allowing for a tolerance error), the note may be categorised as "soiled" and removed from circulation. Alternatively, the amount by which the colour of the area 10 differs from the recorded colour (e.g. the distance in the chosen colour space, or the change in reflectance at the selected wavelength) may be measured and used to infer an amount of soiling. The difference in colour may be compared with one or more thresholds to allocate a soil level to the document, and the document may be sorted according to the soil level.

The location of the designated area 10 may be the same for all documents of the same type, or can vary between documents. Especially in the latter case, it is advantageous if the position of the designated area is also written on the document in a machine readable form. In this way, the soil detection method can use the data to determine which area of the document should be measured and compared with the code 11. Even where the area 10 is in the same position on each note, it may be useful to provide this information so that a template does not need to be stored in memory. Location information can be provided by encoding the co-ordinates and dimensions of the designated area and storing this information in the code 11 or in another code. Alternatively, a machine-detectable boundary such as magnetic ink could be provided around the designated area.

Notes are typically manufactured in batches, each batch corresponding to one print run. All notes from each batch will be substantially identical since the same paper type and same printing process is applied. As such, it is not essential that the colour of area 10 be measured on each note in any one batch. Instead, the colour of the designated area may be measured from a single note, or a subset of the notes in the batch, and the measured colour encoded and written onto every note in the batch. If measurements from more than one note are taken, an average colour may be calculated and used.

A system may also be provided for calibrating the measurement apparatus used for initial spectral encoding and for the later spectral measurement during sorting. This may consist of at least one calibration document with very stable spectral reflectivity over time (i.e. which does not degrade and is maintained in a clean way) which has its spectral content measured in the prescribed way on the "master apparatus" and recorded. This calibration document presented to the active measurement apparatus can be used in banknote manufacture and banknote sorting to set the measurement sensitivity of the apparatus in use to the same as that of the master apparatus. The calibration document(s) can also be presented to the master apparatus periodically to maintain its response against any sensitivity drift. The calibration document may be of any form: ink on paper, metal deposited on glass, coloured plastic, interference filter, etc.

Examples of methods used to manufacture the soil or wear test feature, and to detect soiling or wear of the document will now be described in more detail with reference to FIGS. 4, 5, 6 and 7.

Figure 4:
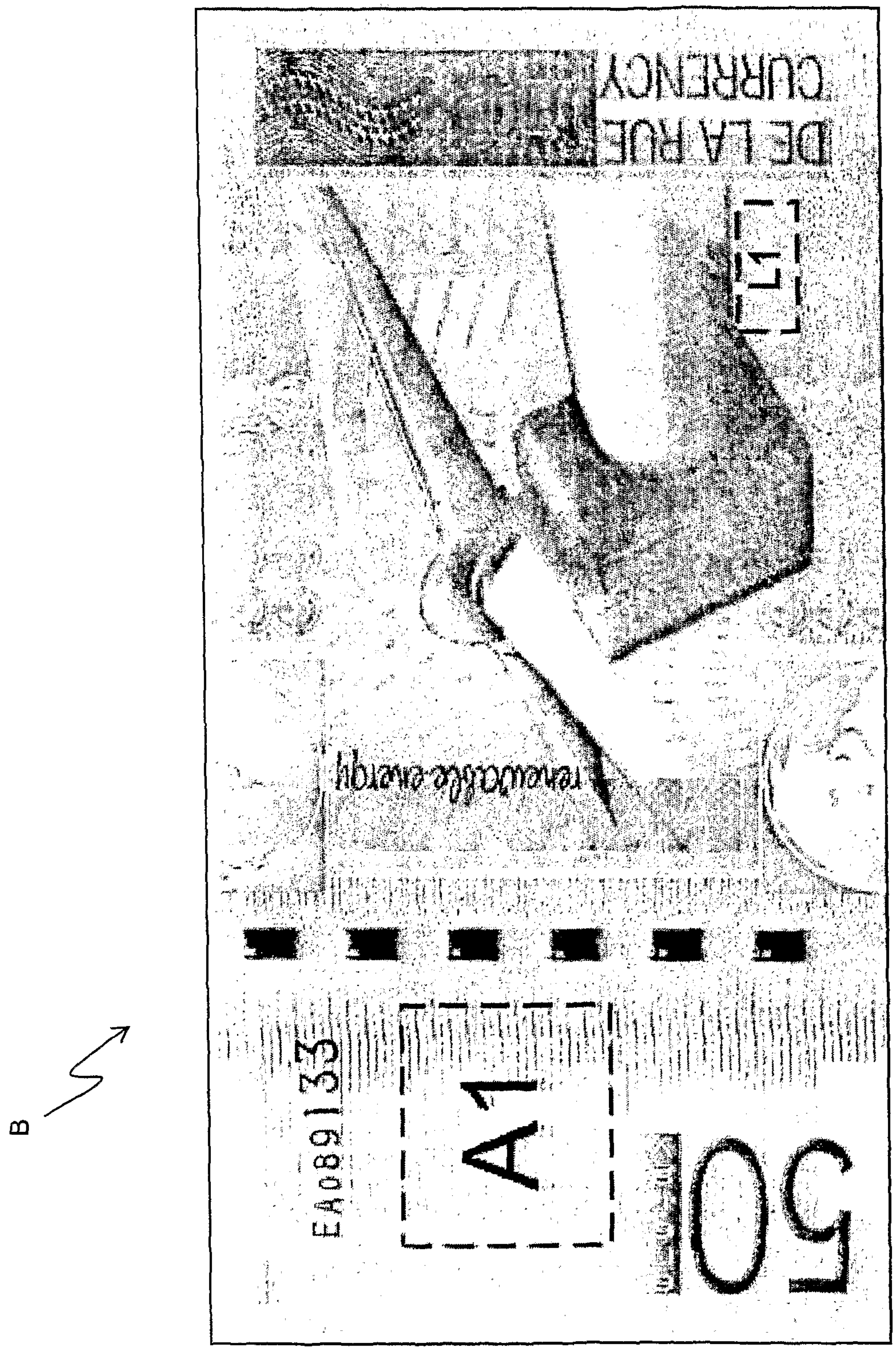
FIG. 4 shows a second embodiment of a document of value.
Figure 5:
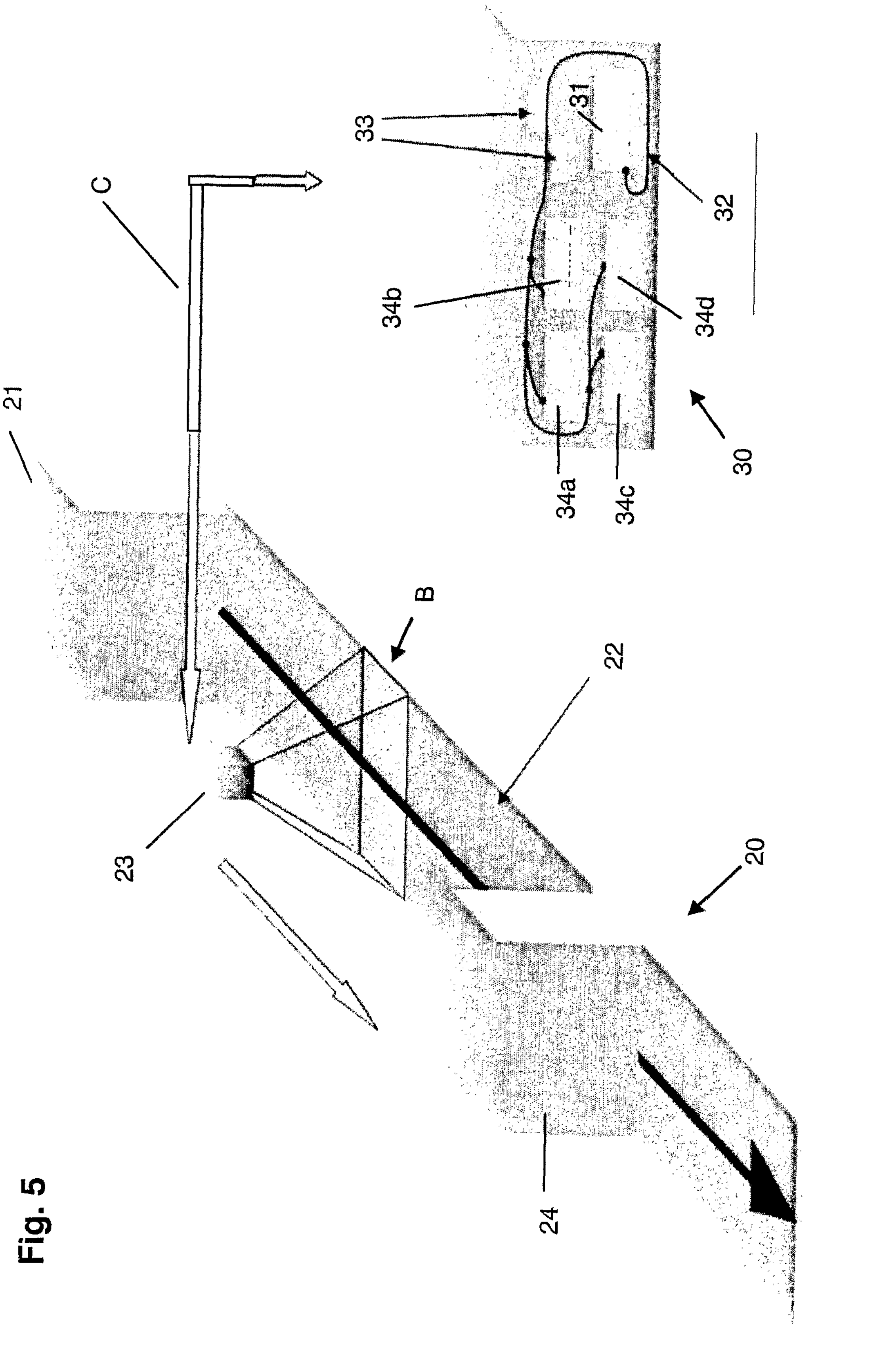
FIG. 5 shows exemplary apparatus which may be used to manufacture a soil or wear test feature on a document of value, and exemplary apparatus for detecting soiling or wear of such a document.
Figure 6:
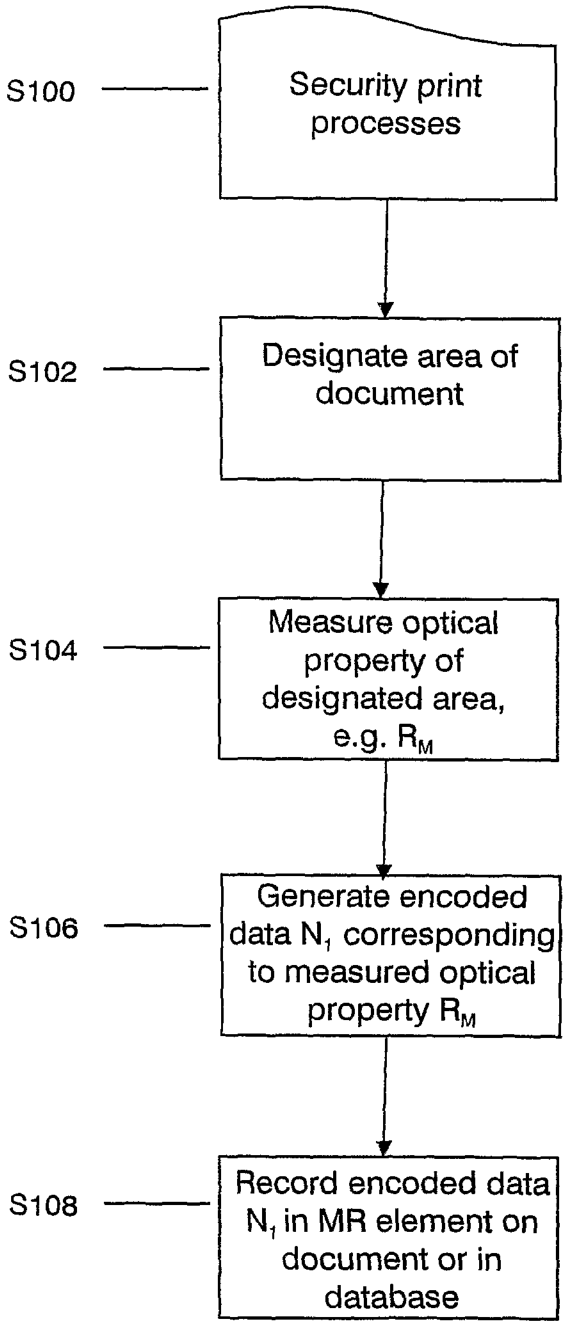
FIG. 6 is a flow diagram showing exemplary steps involved in a method of manufacturing a soil or wear test feature on a document of value.
Figure 7:
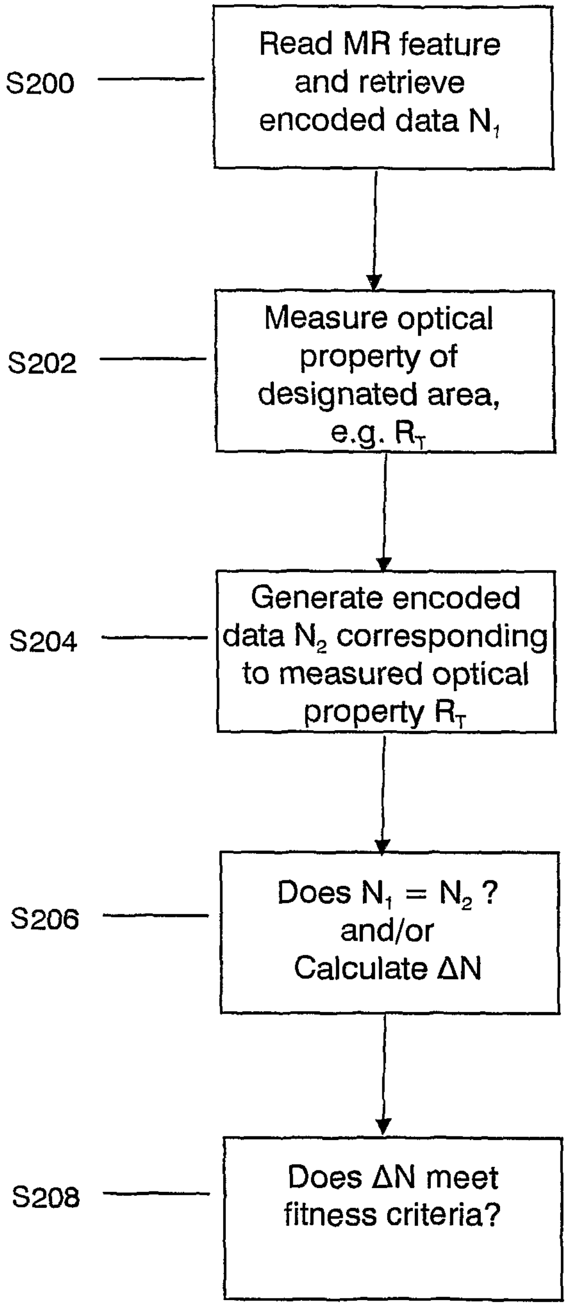
FIG. 7 is a flow diagram showing exemplary steps involved in a method of detecting soil or wear of a document of value.

FIG. 4 illustrates an exemplary banknote B from a set of banknotes for which the soil or wear detection method is to be applied. FIG. 5 is an illustration showing the components that enable the soil or wear sorting method, both in terms of manufacturing the document (left hand side of Figure) and later testing of the document (right hand side of Figure). FIGS. 6 and 7 are flowcharts depicting steps in each process.

Usually, the first step in the manufacturing process takes place during the design origination of the banknote. During development of a new banknote design an area A1 is designated where soil or wear will be measured, and a location L1 where the colour datum information (encoded data) will be printed is identified. Preferably A1 will be in an unprinted area of the banknote, if such exists, and away from the edges of the note. Sheets of banknotes are then printed according to the design using conventional lithographic and intaglio printing. It should be noted that the method can also be applied retrospectively to an existing set of (unissued) banknotes with the locations of A1 and L1 being selected separately from the banknote design process. The step of designating the area A1 is indicated generally by step S102 in FIG. 6.

Suitable apparatus for manufacturing the soil or wear test feature on the banknote B is indicated as 20 in FIG. 5. Here, item 21 represents the output point of a document processing apparatus, such as printing equipment for manufacturing the banknotes. Once printing has been completed (represented by step S100 in FIG. 6, which need not form part of the presently disclosed method), the reflectivity of the area A1 for each individual banknote B is measured using a calibrated light source and camera arrangement 23, conveniently viewing the entire sheet (so that a single camera assembly is needed—although this is not essential and the camera(s) could be arranged to view only a portion of the document) and measuring in the blue region of the spectrum (step S104). For example, wavelengths between 410 and 550 nm may be suitable, preferably between 450 and 500 nm, still preferably around 475 nm. It should be noted that the measurement need not take place after all printing steps are complete (as in this example), but could be performed earlier in the banknote production process.

For each banknote B, the mean (or other average) value $R_M$ of the measured reflectivity of A1 is encoded as an 8 bit number, $N_1$ (step S106). The reflectivity scale is set so that 0% reflectivity encodes as 000 and 100% reflectivity encodes as 255. For each banknote, its encoded measured value $N_1$ is printed in magnetic ink in location L1 using the MICR character set (step S108). In this embodiment inkjet printing is used. If desired, location information specifying the position and extent of area A1 on the banknote B may also be recorded on the document as previously mentioned.

The banknotes are then put into circulation and as a matter of course will pass through the used note sorting machines of the central or commercial banks, one example of which is indicated as 30 in FIG. 5. Generally, such machines include an input module 31 for feeding individual notes into the apparatus from a stack, one or more outputs such as storage modules 34*a* to 34*d*, and transport means for conveying the documents one by one from the input to the outputs. Diverters are provided in the transport path to control the destination of each banknote.

In this embodiment the used note sorter 30 incorporates MICR reading technology including a magnetic head 32. The MICR text printed on the banknote B is read to recover the value $N_1$ (step S200). The used note sorter 30 incorporates optical reflectivity sensors 33 on both sides of the document transport path, operating in the blue region of the spectrum at the same wavelength (or waveband) as that of the camera 23 and calibrated against the same reference standard. Arrow C in FIG. 5 represents this common colour calibration methodology. The reflectivity sensors 33 measure the mean reflectivity of area A1 for the banknote B (step S202). Of course, the order of steps S200 and S202 could be reversed. The location of area A1 is determined either by reference to a stored template for the note type in question, or from location information provided on the document itself. The mean value of the measured reflectivity of A1 measured by sensors 33 is encoded as an 8 bit number, $N_2$, using the same encoding method as that used in the production of the soil or wear test feature (step S204). Thus, the reflectivity scale is set so that 0% reflectivity encodes as 000 and 100% reflectivity encodes as 255.

It should be noted that different scales may be used as appropriate to the document in question: for example, if the designated area is located in a lightly printed region, where the reflectivity will always be 50% or greater, better measurement resolution may be achieved by setting 50% reflectivity to encode as 000 and 100% as 255.

In the next step, the encoded values $N_1$ and $N_2$ are compared. This can be carried out in a number of ways. For instance, if all that is desired is to determine whether there is any soiling/wear, the values could be checked to see if they match (within a predetermined tolerance). If not, this is indicative of some level of soiling. However, if a more quantitative output is desired, in step S206, the difference ΔN between the encoded values $N_1$ and $N_2$ is calculated:

$$\Delta N = N_1 - N_2$$

This value ΔN represents a soil or wear level of the banknote under test: the greater ΔN, the greater the soil or wear level. The operator of the used note sorting machine is provided with the means to sort notes into different soil categories bounded by their chosen values of ΔN or values set by the local monetary authority. In preferred examples, the used note sorting machine 30 is programmed with fitness criteria including at least one threshold value of ΔN above which notes will be deemed to be unfit for reissue. These notes can be sorted to a reject receptacle such as a shredder. Notes passed as fit (where ΔN is below the threshold) can be passed to an appropriate storage cassette for recirculation.

It should be noted that step S204 could be replaced by a step of converting the retrieved encoded data $N_1$ to obtain the original reflectance value measured, $R_M$. The comparison step S206 would then involve comparing $R_M$ with $R_T$ and/or calculating ΔR. ΔR can then be used analogously to ΔN.

FIG. 6 illustrates further possible examples of machine readable elements suitable for encoding the colour datum feature in a banknote design. In each case, the machine readable element is circled for clarity. In FIG. 6*a*, MICR text "196" conveys the encoded data. In FIG. 6*b*, an infrared read barcode is utilised. FIG. 6*c* shows a fluorescent or phosphorescent read barcode. FIG. 6*d* makes use of a visible read alphanumeric code "F3C5DD" and FIG. 6*e* utilised the same code but as an infrared alphanumeric (i.e. not visible to the human eye). Finally, FIG. 6*f* incorporates a magnetic code formed by printing selected regions with magnetic ink. The magnetic ink may be of the same colour as the background so as to render the code invisible.

In a further example, the machine readable element could be a graphic code incorporated into the graphical design of the banknote itself. For instance, the feature could comprise eight different elements such as geometric shapes which are either filled or unfilled (or provided in one of two colours) to form the code. Each element acts as a "bit" of information having two states: "1" (filled/colour 1) and "0" (unfilled/colour 2). Such a technique enables the code to be unobtrusive and not immediately obvious to a member of the public. A higher density code could be achieved with a base 3 code, each bit having 3 possible states: "2" (filled), "1" (50% grey) and "0" (unfilled). Or, using RGB colour, a base 4 code could be employed with each bit having 4 states: "3" (filled red), "2" (filled green), "1" (filled blue) and "0" (unfilled). The greater the number of available states, the fewer bits are required to store the data—or data can be stored with a higher resolution.

FIGS. 9 *a*) and *b*) illustrate such an embodiment where the code is written onto each banknote B/B' as part of a pictorial image and is therefore its presence is not readily apparent to the general public. In FIG. 9, the machine readable elements 40/40' consist of a large central star surrounded by eight smaller stars in positions (i) to (viii), and the data is encoded by varying the number and position of the stars which are filled in. For example, on the banknote B depicted in FIG. 9*a*), positions (i), (iv) and (vii) are filled making the code "10010010", indicating a particular level of reflectivity, while for banknote B' in FIG. 9 *b*), positions (ii), (iv) and (vi) are filled corresponding to the code "01010100", indicating a different level of reflectivity.

In the embodiments described above, the encoded data is stored directly on the document in the machine readable feature. However, in some implementations it may be preferred to reduce the amount of data which need by carried on the document itself by storing the encoded data remotely in a database. In this case, the machine readable element need only carry a unique identifier which distinguishes that document from many other similar documents. This may be provided, for example, by the serial number of a banknote or another identification code applied to the document. In step S108 of the method depicted in FIG. 6, the encoded data $N_1$ is recorded in a database alongside the unique identifier (which, if pre-existing, may also be captured optically from the document or may be generated dynamically and then applied to the document). When the document is to be tested, in step S200, once the identification number has been read from the machine readable element, it is used to look up the database in order to retrieve the encoded data $N_1$. The database is made available to the central bank (or other operator carrying out fitness testing) by the manufacturer of the soil/wear test feature. The database could also be used to store location information of the designated area on the document if desired.

In any of the above embodiments, the encoded data recorded on the document may also include verification data which, when read with the encoded data, allows an automatic system to check that such a data sequence is correct. By having longer and more complicated verification data, more exact checks can be made to verify that an error has not occurred amongst the encoded data. In these cases an automated system can perform the verification checks on a complete data sequence including the encoded data and verification data and provide a near instantaneous identification of an error. There are many different types of verification data known in the art that can be used and a common solution is to include a check digit after a sequence of digits. This digit is chosen so that all the digits in the data sequence, including the check digit, satisfy a mathematical formula or equation. A common equation is known in the art as the "IBM check" which is used on the sequence of digits which make up a credit card number. The algorithm runs as follows: the digits in even positions, numbering from the right, are multiplied by two; any digits now greater than nine are reduced to a single digit by subtracting nine (equivalent to adding the two digits of the multi digit number); and finally all the digits in the sequence are summed and a check digit added to make the result evenly divisible by ten. Other possible check digit schemes also include the modulo 11 scheme used in the International Standard Book Number (ISBN) or the Electron Funds Transfer (EFT) routing number check which performs a modulo 10 operation on a weighted sum of the digits in a sequence. Examples of check digits are described in patent application WO2008007064A1.

The invention claimed is:

1. A method of manufacturing a soil or wear test feature on a document of value, comprising:

designating an area of the document of value for soil or wear testing;

measuring the value of a property of the document which is affected by the presence of soil or wear from the designated area on the document of value, or from the same area on an identical document of value;

encoding the measured value of the property to generate a corresponding encoded property data value comprising the measured value of the property; and associating the encoded property data value with the document of value by means of a machine readable element provided on the document of value, whereby a comparison of the encoded property data value with the property value of the designated area provides an indicator of the degree of soiling or wear of the document of value.

2. A method according to claim 1 wherein the encoded property data is associated with the document of value by storing the encoded property data in the machine readable element.

3. A method according to claim 1 wherein the encoded property data is associated with the document of value by storing the encoded property data in a database and storing a unique identifier in the machine readable element on the document of value, the unique identifier being linked to the encoded property data in the database.

4. A method according to claim 1, wherein the machine readable element comprises: a machine-readable alphanumeric code; a one-dimensional or two-dimensional barcode; a graphic design code, a magnetic ink character recognition code, or a RFID chip.

5. A method according to claim 1, wherein the designated area for soil or wear testing comprises a region which is less than the full area of the document of value.

6. A method according to claim 1, further comprising associating the document of value with location data identifying the location of the designated area for soil or wear testing on the document of value by means of the machine readable element or a second machine readable element provided on the document.

7. A method according to claim 6, wherein associating the document of value with location data comprises encoding the location of the designated area to generate encoded location data, and associating the encoded location data with the document of value.

8. A method according to claim 1, wherein the measured property is an optical characteristic of the document.

9. A method according to any claim 8, wherein the measured optical characteristic is any of: reflected or transmitted colour, reflectance, light scatter, gloss, roughness, luminescence or fluorescence.

10. A method according to claim 1, further comprising providing the designated area with an element of increased susceptibility to soiling and/or wear relative to other areas of the document, preferably a frangible structure.

11. A method according to claim 1, wherein the identical document of value is manufactured in the same batch or run as the document of value on which the soil or wear test feature is manufactured.

12. A method according to claim 1, wherein the property is measured prior to any printing of the document of value.

13. A method according to claim 1, wherein the property is measured after at least some, preferably all, printing of the document of value has taken place.

14. A method according to claim 1, wherein the document of value is a banknote, cheque, certificate, passport or other security document.

15. A document of value comprising a soil or wear test feature, the soil or wear test feature comprising:

a designated area of the document of value for soil or wear testing; and a machine readable element in which data is stored, which associates the document of value with an encoded property data value generated from the measurement of the value of a property which is affected by the presence of soil or wear of the designated area on the document of value, or of the same area on an identical document of value the encoded property data value comprising the measured value of the property;

whereby a comparison of the encoded property data value with the property value of the designated area provides an indicator of the degree of soiling or wear of the document of value.

16. A method of detecting soiling or wear of a document of value, comprising:

measuring the value of a property of the document which is affected by the presence of soil or wear of a designated area on the document of value;

reading data from a machine readable element provided on the document of value to retrieve an encoded property data value generated from previous measurement of the value of the property of the designated area, or of the same area on an identical document of value, the encoded property data value comprising the previously measured value of the property; and comparing the measured property value with the encoded property data value to identify any difference therebetween, a difference being indicative of soiling or wear of the document of value.

17. A method according to claim 16, wherein the step of comparing comprises calculating the difference between the measured property and the encoded property data, the calculated difference providing an indicator of the degree of soiling or wear of the document of value.

18. A method according to claim 17, further comprising comparing the calculated difference with a predetermined fitness criterion representative of documents fit for reissue, and sorting the document of value based on the outcome of the comparison.

19. A method according to claim 16, wherein the document of value is a document of value comprising a soil or wear test feature, the soil or wear test feature comprising:

a designated area of the document of value for soil or wear testing; and a machine readable element in which data is stored, which associates the document of value with encoded property data generated from the measurement of a property which is affected by the presence of soil or wear of the designated area on the document of value, or of the same area on an identical document of value;

whereby a comparison of the encoded property data with the property of the designated area provides an indicator of the degree of soiling or wear of the document of value.

20. An apparatus for detecting soiling or wear of a document of value, comprising:

a device adapted to measure the value of a property of the document which is affected by the presence of soil or wear of a designated area on the document of value;

a reader adapted to read data from a machine readable element provided on the document of value to retrieve an encoded property data value generated from previous measurement of the value of the property of the designated area, or of the same area on an identical document of value, the encoded property data value comprising the previously measured value of the property; and a comparator adapted to compare the measured property value with the encoded property data value to identify any difference therebetween, a difference being indicative of soiling or wear of the document of value.

21. An apparatus according to claim 20, wherein the comparator is adapted to calculate the difference between the measured property and the encoded property data, the calculated difference providing an indicator of the degree of soiling or wear of the document of value.

22. An apparatus according to claim 21, wherein the comparator is further adapted to compare the calculated difference with a predetermined fitness criterion representative of documents fit for reissue.

* * * * *